H. G. Dayton's Still.

72816

PATENTED DEC 31 1867

Witnesses:
Theo Tusche
J. A. Fraser

Inventor:
H. G. Dayton
Per Munn & Co.
Attorneys

United States Patent Office.

H. G. DAYTON, OF MAYSVILLE, KENTUCKY.

Letters Patent No. 72,816, dated December 31, 1867.

IMPROVED ALCOHOL AND SPIRIT-STILL.

*The Schedule referred to in these Letters Patent and making part of the same.*

TO ALL WHOM IT MAY CONCERN:

Be it known that I, H. G. DAYTON, of Maysville, in the county of Mason, and State of Kentucky, have invented a new and improved Distilling-Apparatus; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
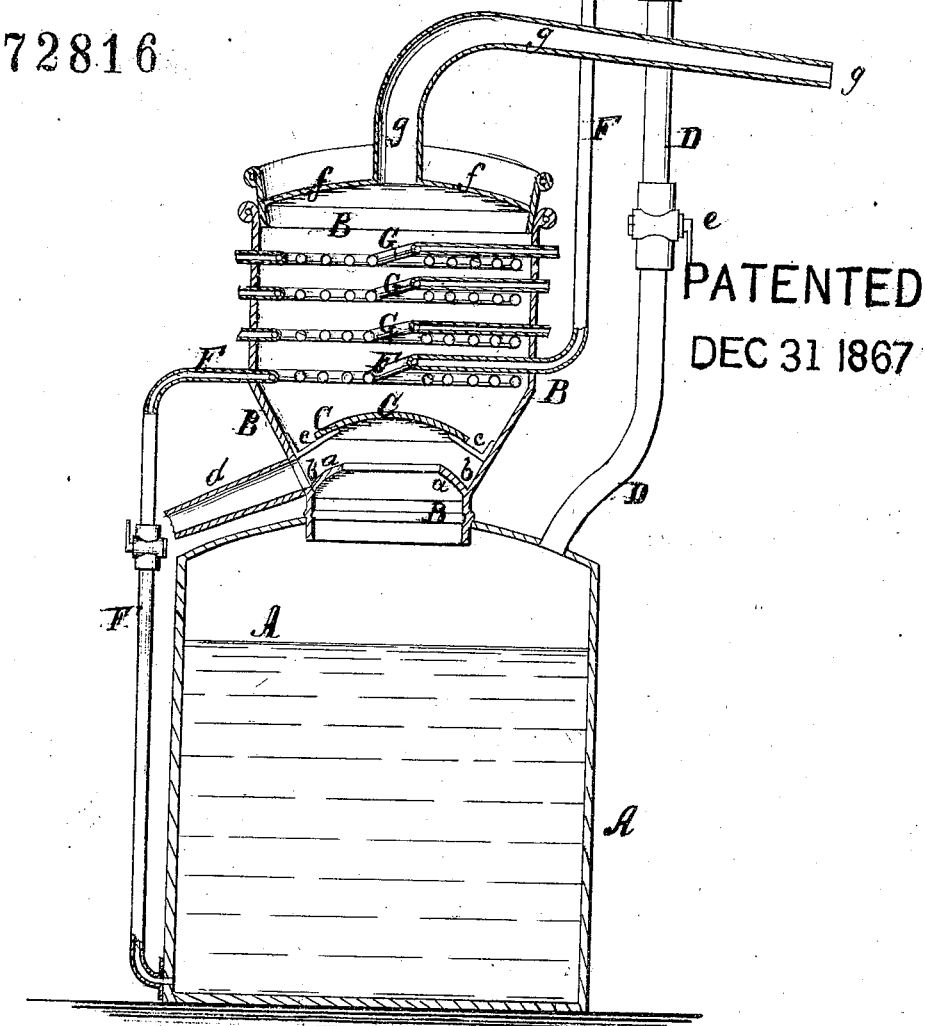
Figure 1 represents a sectional elevation of my improved apparatus.
Figure 2:
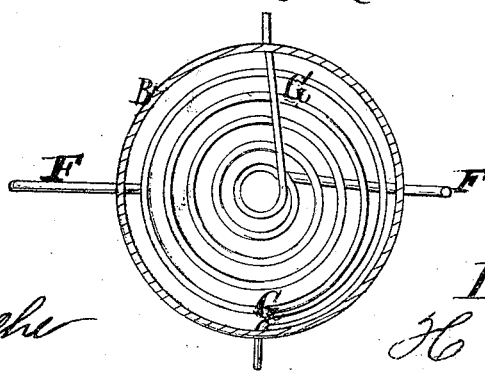
Figure 2 is a plan or top view of the same.

This invention relates to a new distilling-apparatus, and its object is to effect a slow and gradual distillation to separate the fine spirits from the fusel and bad spirits.

The invention consists in placing upon the still a condenser, which is provided with a plate above the opening in the still, which plate prevents heavy, impure vapors from rising into the condenser and mixing with the pure spirits, and which plate will also prevent the vapors that have been condensed from falling back into the still. Those spirits which are condensed, fall into an annular trough that is arranged within the vessel; thence they may be conducted through a suitable pipe to a suitable cooling-apparatus. Those fine spirits which are not condensed in the vessel, pass through a pipe that is fitted to the cover of the vessel to another cooling-apparatus, and thus the finest spirits are separated from the ordinary. The first products of distillation, which are produced from the mash in an ordinary still, are carried through the vessel in a coil to the still, and are thus in the vessel warmed so as not to check the distilling operation by entering the still when cold.

A represents an ordinary or suitable still. Upon the cover of the same is fastened a vessel, B, made of sheet metal, or other suitable material, with wider upper than lower part, as shown. The lower part of this vessel, B, is made of inverted conical shape, as shown, and on the inside of this conical part is formed an annular flange, a, which, in connection with the side to which it is secured, forms an annular trough, b, as shown. Above the trough b is secured, in the vessel B, a crown-plate, C, which is of circular form, somewhat curved, or at least higher in the centre than on the edges, as shown. It is secured by means of braces c c, or otherwise, to the vessel, and its edges are above the trough, so that any liquid falling upon the crown-plate will flow down to the edge of the same, and will then drop into the trough. A pipe, d, leads from the trough to a suitable cooler. D is a pipe, leading from a suitable tank or vessel, E, to the still A. The liquid which is in an ordinary still produced by first distillation from the mash, is confined in the vessel E, and is fed to the still A through the pipe D until it has reached a certain height in the still. The cock e in the pipe D is then closed, and distillation begins. Another pipe, F, connects the still with the vessel E, as shown, said pipe F passing through the vessel B in a large extensive coil, as shown. In the vessel B are also arranged coils G, through which cold water or other liquid is carried, one or more such coils being arranged, each one receiving its own independent stream of cooling-liquid. From the cover f of the vessel B extends a pipe, g, into a suitable cooling-vessel.

The operation is as follows: When the still has been filled to the desired height through the pipe D, the cock e is closed, and the liquid in the still is heated. The vapors thus created pass upward into the vessel B, and around the crown-plate C against the cooling-coils G, where they are condensed, falling upon the plate C, thence into the trough b, and are carried off through the pipe d. But the finest vapors, those of the high-proof spirits, are not condensed in the vessel B, and rise in the same into the pipe g, whence they are conducted to a suitable cooler. Thus the high-proof spirits are separated from the medium kinds, and are thus retained in their full value. The impure vapors that may rise with the vapors from the still will strike against the under side of the crown-plate C, and will, as they have not vitality enough to remain in their vaporous state, be condensed on the plate C, and will drop back into the still, so that thus, by means of the crown-plate, the return of condensed spirits to the still is prevented, and the entry of the low heavy vapors into the vessel B is prohibited. While thus the vapors are constantly rising in the still, and are being condensed in the vessel B, the supply to the still is kept up through the pipe F in such a manner that the contents of the still remain at an equal level throughout the operation.

The liquid thus flowing into the still during the distilling operation is moderately heated while passing through the vessel B, thus being prepared for the still.

Having thus described my invention, what I claim as new, and desire to secure by Letters Patent, is—

1. Carrying the liquid, with which a still is to be supplied, through the condensing-vessel B, for the purposes of moderately heating it by the rising vapors, and for thus preparing it for the still, substantially as herein shown and described.

2. Providing the vessel B with a crown-plate, C, by which the heavy vapors are separated from the spirits, and by which the condensed spirits are prevented from falling back into the still, substantially as herein shown and described.

3. The annular trough $b$, when formed on the inside of the vessel B, in combination with the crown-plate C, all made and operating substantially as and for the purpose herein shown and described.

4. The vessel B, provided with a trough, $b$, crown-plate C, cooling-coils G, and discharge-pipes $d$ and $g$, all made and operating so that the finest are separate from the medium spirits, as set forth.

H. G. DAYTON.

Witnesses:
 WM. F. McNAMARA,
 ALEX. F. ROBERTS.